(12) United States Patent
Watanabe et al.

(10) Patent No.: US 11,390,767 B2
(45) Date of Patent: Jul. 19, 2022

(54) INK SET, PRINTING METHOD, AND PRINTING APPARATUS

(71) Applicant: Seiko Epson Corporation, Tokyo (JP)

(72) Inventors: Tadashi Watanabe, Shiojiri (JP); Ippei Okuda, Shiojiri (JP)

(73) Assignee: Seiko Epson Corporation

(*) Notice: Subject to any disclaimer, the term of this patent is extended or adjusted under 35 U.S.C. 154(b) by 43 days.

(21) Appl. No.: 17/002,057

(22) Filed: Aug. 25, 2020

(65) Prior Publication Data

US 2021/0062027 A1  Mar. 4, 2021

(30) Foreign Application Priority Data

Aug. 26, 2019  (JP) .............................. JP2019-154029

(51) Int. Cl.
*C09D 11/40* (2014.01)
*C09D 11/54* (2014.01)
(Continued)

(52) U.S. Cl.
CPC ............. *C09D 11/40* (2013.01); *B41J 2/2107* (2013.01); *B41J 2/2114* (2013.01);
(Continued)

(58) Field of Classification Search
CPC ... C09D 11/107; C09D 11/322; C09D 11/101; C09D 11/326; C09D 11/38; C09D 11/36; C09D 11/40; C09D 11/30; C09D 11/32; C09D 11/324; C09D 11/328; C09D 11/102; C09D 11/005; C09D 11/54; C09D 11/52; C09D 11/106; C09D 11/03; C09D 11/037; C09D 11/033; B41J 11/0021; B41J 2/2107; B41J 2/01; B41J 11/002; B41J 2/211; B41J 2/1433; B41J 2/17; B41J 2/17593; B41J 2/1755; B41J 2/2114; B41J 2/2117; B41J 2/2056; B41J 2/21; B41J 2/0057; B41J 3/60; B41J 2002/012; B41J 2/04598; B41J 2/04588; B41J 2/04595; B41J 2/04586; B41J 2/14274; B41J 2/1623; B41J 2202/00; B41J 2202/03; B41J 2/14201; B41J 2/045; B41J 11/0015; B41J 2/04581; B41J 2/055; B41J 2/16538; B41J 2002/16502; B41J 29/02; B41J 2/17513; B41J 2/17509; B41J 29/13; B41J 2/17553; B41J 2/1606; B41J 2/1642; B41J 2/1609; B41J 2/164;
(Continued)

(56) References Cited

U.S. PATENT DOCUMENTS 6,193,361 B1 * 2/2001 Wen ..................... B41J 2/01
  347/84
6,428,143 B2 * 8/2002 Irihara .................. B41J 2/2114
  347/100

(Continued)

FOREIGN PATENT DOCUMENTS

JP  2015-147405 A  8/2015

*Primary Examiner* — Manish S Shah
(74) *Attorney, Agent, or Firm* — Harness, Dickey & Pierce, P.L.C.

(57) ABSTRACT

An ink set to be used for printing poorly absorbent or non-absorbent printing media includes an aqueous non-white ink composition containing a non-white pigment, an aqueous white ink composition containing a white pigment, and a treatment liquid containing a flocculant and an alkanolamine.

16 Claims, 1 Drawing Sheet

(51) Int. Cl.
  *C09D 11/322* (2014.01)
  *B41M 7/00* (2006.01)
  *B41M 5/00* (2006.01)
  *C09D 11/102* (2014.01)
  *B41J 2/21* (2006.01)

(52) U.S. Cl.
  CPC ........ *B41M 5/0017* (2013.01); *B41M 5/0023* (2013.01); *B41M 7/009* (2013.01); *B41M 7/0036* (2013.01); *C09D 11/102* (2013.01); *C09D 11/322* (2013.01); *C09D 11/54* (2013.01)

(58) Field of Classification Search
  CPC ..... B41J 2/162; B41J 2/161; B41J 2/19; B41J 15/04; B41J 25/001; B41J 25/34; B41J 25/003; B41J 25/312; B41J 2025/008; B41J 2202/21; B41J 2/17596; B41J 2/16508; B41J 2/1652; B41J 2/175; B41J 2/17563; B41M 5/0023; B41M 7/0081; B41M 3/006; B41M 3/003; B41M 5/0011; B41M 5/0017; B41M 5/0047; B41M 7/00; B41M 7/0072; B41M 5/52; B41M 5/5218; B41M 5/5227; G02B 5/20; G02B 5/223; C08K 3/11; C08K 2003/2237
  See application file for complete search history.

(56) References Cited

U.S. PATENT DOCUMENTS

| | | | |
|---|---|---|---|
| 2012/0287211 A1* | 11/2012 | Sano | B41J 2/07 347/100 |
| 2013/0135382 A1* | 5/2013 | Mitsuzawa | C09D 11/322 347/20 |
| 2013/0249996 A1* | 9/2013 | Saito | B41J 2/2114 347/21 |
| 2015/0035898 A1* | 2/2015 | Okuda | B41J 2/01 347/20 |
| 2015/0197654 A1 | 7/2015 | Okuda et al. | |
| 2016/0194824 A1* | 7/2016 | Ohashi | C09D 11/322 347/20 |
| 2017/0166764 A1* | 6/2017 | Katsuragi | B41J 2/14016 |
| 2017/0232763 A1* | 8/2017 | Okuda | B41J 2/2114 347/21 |
| 2017/0291431 A1* | 10/2017 | Nakano | B41J 2/2107 |

* cited by examiner

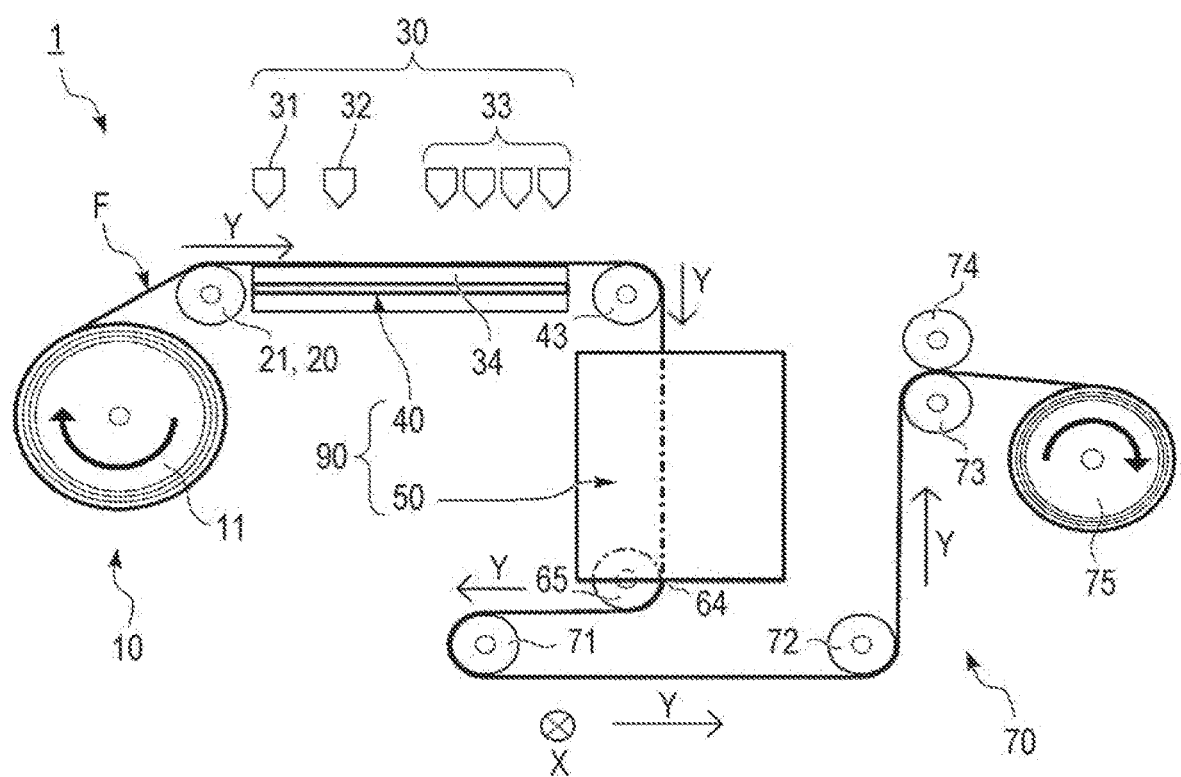

INK SET, PRINTING METHOD, AND PRINTING APPARATUS

The present application is based on, and claims priority from JP Application Serial Number 2019-154029, filed Aug. 26, 2019, the disclosure of which is hereby incorporated by reference herein in its entirety.

BACKGROUND

1. Technical Field

The present disclosure relates to an ink set, a printing method, and a printing apparatus.

2. Related Art

Ink jet printing methods, which enable high-definition printing with a relatively simple apparatus, continue to be rapidly developed in various fields. A variety of researches on printing have been conducted for reducing bleeding, coalescence, and similar image defects. For example, JP-A-2015-147405 discloses a printing method that can prevent bleeding of inks and reduce coalescence of the inks, and that is unlikely to cause the inks to clog nozzles, when a plurality of inks are applied one on top of another onto a non-absorbent or poorly absorbent printing medium. This printing method includes applying a first treatment liquid, a first ink containing a coloring material, a second treatment liquid, and a second ink containing a coloring material, in this order one on top of another, onto a non-absorbent or poorly absorbent printing medium. The first treatment liquid contains a flocculant capable of flocculating one or more components of the first ink or thickening the first ink, and the second treatment liquid contains a flocculant capable of flocculating one or more components of the second ink or thickening the second ink.

In printing methods using such a treatment liquid, the flocculant contained in the treatment liquid flocculates one or more components of an ink composition, thus rapidly solidifying the coating of the ink. When a white ink and color inks are printed one on top of another, the thus formed superimposed ink coating cracks sometimes during secondary drying. It has been found that, in particular, the use of a treatment liquid increases the incidence of cracks.

SUMMARY

Accordingly, there is provided an ink set used for printing poorly absorbent or non-absorbent printing media. The ink set includes an aqueous non-white ink composition containing a non-white pigment, an aqueous white ink composition containing a white pigment, and a treatment liquid containing a flocculant and an alkanolamine.

The non-white ink composition may contain a pigment-dispersing resin having an acid value of 20 mg KOH/g to 300 mg KOH/g.

The non-white ink composition may contain a pigment-dispersing resin having an amine value of 10 mg KOH/g or less.

The white ink composition may contain a pigment-dispersing resin having an acid value of 10 mg KOH/g or less.

In the treatment liquid, the alkanolamine content may be 0.1% to 2% relative to the total mass of the treatment liquid.

The ink set may further include a clear ink composition.
The treatment liquid may contain resin fine particles.

The flocculant may be a water-soluble compound selected from the group consisting of multivalent metal salts, organic acids, and cationic polymers.

The alkanolamine in the treatment liquid may have a normal boiling point of 350° C. or less.

The present disclosure is also directed to a printing method for printing a poorly absorbent or non-absorbent printing medium. The printing method includes a treatment application step of applying a treatment liquid containing a flocculant and an alkanolamine onto the printing medium to form a treatment liquid coating, a white ink application step of applying an aqueous white ink composition containing a white pigment onto the printing medium to form a white ink coating, and a non-white ink application step of applying an aqueous non-white ink composition containing a non-white pigment onto the printing medium to form a non-white ink coating. The non-white ink coating, the white ink coating, and the treatment liquid coating are formed one on top of another to define a superimposed region.

The white ink application step and the non-white ink application step may be performed after the treatment liquid application step in such a manner that one of the white ink composition and the non-white ink composition is applied before the other, in a region that is to be the superimposed region, onto the treatment liquid coating in a state where the percentage of solvent remaining is 50% by mass or more.

The printing method may include a heating step of heating the printing medium after the treatment liquid application step and in the white ink application step or the non-white ink application step.

The printing method may include a clear ink application step of applying a clear ink composition onto the printing medium to form a clear ink coating.

The white ink composition, the non-white ink composition, and the clear ink composition may be applied by an ink jet method performed by alternately repeating a main scanning motion and a sub-scanning motion. In this instance, one of the white ink composition and the non-white ink composition is applied subsequent to the other in the same main scanning motion as the clear ink composition.

The present disclosure is further directed to a printing apparatus used for printing poorly absorbent or non-absorbent printing media. The printing apparatus includes a non-white ink application mechanism configured to apply an aqueous non-white ink composition containing a non-white pigment onto a printing medium, a white ink application mechanism configured to apply an aqueous white ink composition containing a white pigment onto the printing medium, and a treatment liquid application mechanism configured to apply a treatment liquid containing a flocculant and an alkanolamine onto the printing medium.

BRIEF DESCRIPTION OF THE DRAWING

The FIGURE is a schematic side view of an ink jet printing apparatus used in an embodiment of the present disclosure.

DESCRIPTION OF EXEMPLARY EMBODIMENTS

Some embodiments of the present disclosure will now be described in detail with reference to the drawing as needed. However, the implementation of the concept of the present disclosure is not limited to the embodiments described herein, and various modifications may be made without departing from the scope and spirit of the present disclosure.

The same elements in the drawing are designated by the same reference numerals, and thus description thereof is omitted. The relative positions and other positional relationship are in accordance with the drawing unless otherwise specified. The dimensional proportions in the drawing are not limited to those illustrated in the drawing.

1. Ink Set

The ink set disclosed herein is used for printing poorly absorbent or non-absorbent printing media. The ink set includes an aqueous non-white ink composition containing a non-white pigment, an aqueous white ink composition containing a white pigment, and a treatment liquid containing a flocculant and an alkanolamine. In an embodiment, the ink set may further include a clear ink composition.

The present inventors have found through their studies that the incidence of cracks increases when a white ink and color inks are printed with a treatment liquid one on top of another. The reason for this is probably, but not limited to, that a reaction of an ink with the treatment liquid causes some constituents of the ink to come together to form large particles resulting in a coarse coating. This coating cracks easily due to a difference in heat shrinkage when rapidly dried by heating. Multilayer coatings formed of a white ink coating and a color ink coating are particularly likely to crack, suggesting that the difference in composition between the coatings can cause cracks.

In the present disclosure, a treatment liquid containing an alkanolamine in addition to a flocculant is used. When the present inventors formed a multilayer coating by printing a white ink and a color ink with such a treatment liquid, cracks were reduced. The reason for this is probably, but not limited to, that the alkanolamine relieves the reaction of the inks with the flocculant, thus suppressing the formation of large particles in the ink coatings. The treatment liquid and the ink compositions will now be described in detail.

1. 1. Treatment Liquid

The treatment liquid contains a flocculant and an alkanolamine and may optionally contain water, a water-soluble organic solvent, resin fine particles, and a surfactant. The constituents of the treatment liquid will be described below.

1. 1. 1. Flocculant

The flocculant reacts with any of the constituents in the ink compositions, beneficially with either the coloring material or the resin, thereby flocculating such a constituent to rapidly solidify and fix the ink on the printing medium. Thus, the flocculant fixes ink droplets that have touched on the printing medium to prevent the droplets from interfering with each other, helping the formation of high-quality images. The flocculant that can be used in the treatment liquid may be, but is not limited to, a water-soluble compound, such as a multivalent metal salt, an organic acid, or a cationic polymer. The flocculant may be an individual one or a combination of such compounds.

The flocculant content in the treatment liquid may be 0.5% to 10%, for example, 1% to 8% or 2% to 6%, relative to the total mass of the treatment liquid. When the flocculant content is in such a range, the treatment liquid tends to reduce the interference with ink droplets one another, thus helping to increase image quality and reducing cracks.

Multivalent metal salts are compounds composed of a divalent or higher-valent metal ion and an anion. Examples of the divalent or higher-valent metal ion include $Ca^{2+}$, $Mg^{2+}$, $Cu^{2+}$, $Ni^{2+}$, $Zn^{2+}$, and $Ba^{2+}$. Examples of the anion include $Cl^-$, $NO_3^-$, $CH_3COO^-$, $I^-$, $Br^-$, $ClO_3^-$, and $SO_4^-$. In view of effective flocculation, the flocculant may be selected from among magnesium salts, calcium salts, and aluminum salts. The multivalent metal salt used as the flocculant may be any combination of the above-presented multivalent metals and anions and may be a hydrate of such a metal salt. The multivalent metal salt may be an individual one or a combination of two or more multivalent metal salts.

The multivalent metal salt content in the treatment liquid may be 0.5% to 10%, for example, 1% to 8% or 2% to 6%, relative to the total mass of the treatment liquid. When the multivalent metal salt content is in such a range, the treatment liquid tends to reduce interference with ink droplets one another, thus helping to increase image quality and reducing cracks.

Examples of the organic acid include, but are not limited to, phosphoric acid, oxalic acid, malonic acid, succinic acid, citric acid, acetic acid, propionic acid, and lactic acid. Monovalent or divalent carboxylic acids may be often used. Use of such a carboxylic acid is effective in suppressing bleeding in the resulting printed item. Organic acids may be used individually or in combination.

The organic acid content in the treatment liquid may be 0.5% to 10%, for example, 1% to 8% or 2% to 6%, relative to the total mass of the treatment liquid. When the organic acid content is in such a range, the treatment liquid tends to reduce interference with ink droplets one another, thus helping to increase image quality and reducing cracks.

The cationic polymer is a water-soluble polymer that is positively charged in water and is not otherwise limited. The cationic polymer may be an amine-based resin or a cationic urethane resin. Examples of the cationic polymer include polyamine resin, polyamide resin, polyallylamine resin, and resin produced from epihalohydrin and an amine compound. The polyamine resin used as the flocculant is a resin having an amino group on the backbone of the molecule thereof and is not otherwise limited. The polyamide resin used as the flocculant is a resin having an amide group on the backbone of the molecule thereof. The polyallylamine resin is a resin having a structure derived from an allylamine on the backbone of the molecule thereof and may be a polyallylamine or a polyallylamine derivative.

The cationic polymer content in the treatment liquid may be 0.5% to 10%, for example, 1% to 8% or 2% to 6%, relative to the total mass of the treatment liquid. When the cationic polymer content is in such a range, the treatment liquid tends to reduce interference with ink droplets one another, thus helping to increase image quality and reducing cracks.

1. 1. 2. Alkanolamine

Aklanolamines are chemical compounds that contain both hydroxy and amino functional groups on an alkane backbone. The number of hydroxy groups of the alkanolamine is 1 or more and may be 1 to 5. In some embodiments, it may be 2 or 3. The carbon number of the alkanolamine may be 1 to 20, for example, 2 to 10 or 6 to 9, in the molecule. The carbon number of the individual alkane backbones may be 1 to 6, for example, 2 to 4. The number of amino groups of the alkanolamine is 1 or more and may be 1 to 5. In some embodiments, it may be 1 or 2.

Examples of the alkanolamine include, but are not limited, triethanolamine, tripropanolamine, triisopropanolamine, and tributanolamine. Triethanolamine and triisopropanolamine are beneficial. In some embodiments, triisopropanolamine may be used. The alkanolamine used in the treatment liquid may be an individual alkanolamine or a combination of two or more alkanolamines.

The normal boiling point of the alkanolamine may be 350° C. or less, for example, 330° C. or less or 310° C. or less. Also, the normal boiling point of the alkanolamine may be 250° C. or more. In some embodiments, the normal boiling point of the alkanolamine may be 250° C. to 350° C. or 300° C. to 330° C. The alkanolamine having a normal boiling point in such a range tends to be effective in reducing cracks and increasing the rub resistance of the printed item.

The alkanolamine content in the treatment liquid may be 0.1% to 5%, for example, 0.1% to 2%, 0.1% to 1%, 0.2% to 0.9%, or 0.4% to 0.8%, relative to the total mass of the treatment liquid. When the alkanolamine content is in such a range, the treatment liquid tends to further reduce cracks.

1. 1. 3. Water

The water content in the treatment liquid may be 50% to 99%, for example, 50% to 85%, 55% to 80%, or 60% to 75%, relative to the total mass of the treatment liquid. When the water content is in such a range, the treatment liquid is likely to be consistently ejected by an ink jet method. In some embodiments, the treatment liquid is an aqueous composition. An aqueous composition refers to a composition containing water as a major solvent. The water content in an aqueous composition may be 45% or more relative to the total mass of the composition.

1. 1. 4. Water-Soluble Organic Solvent

Examples of the water-soluble organic solvent include alcohols, such as methanol, ethanol, and isopropyl alcohol; ketones and ketoalcohols, such as acetone and diacetone alcohol; ethers, such as tetrahydrofuran and dioxane; glycols, such as ethylene glycol, diethylene glycol, triethylene glycol, polyethylene glycol, propylene glycol, dipropylene glycol, tripropylene glycol, polypropylene glycol, propanediol, butanediol, pentanediol, and hexylene glycol; lower alkyl ethers of glycols, such as ethylene glycol monomethyl ether, diethylene glycol monomethyl ether, diethylene glycol monoethyl ether, and diethylene glycol monobutyl ether; and glycerin, 2-pyrrolidone, and N-methylpyrrolidone. Beneficially, the water-soluble organic solvent may be selected from among glycerin, diethylene glycol, ethylene glycol, ethylene glycol monomethyl ether, diethylene glycol monobutyl ether, triethylene glycol monomethyl ether, and triethylene glycol monobutyl ether. In some embodiments, ethylene glycol may be used. The water-soluble organic solvent used in the treatment liquid may be an individual compound or a combination of two or more solvents.

The water-soluble organic solvent content in the treatment liquid may be 5% to 35%, for example, 10% to 30% or 15% to 25%, relative to the total mass of the treatment liquid. When the water-soluble organic solvent content is in such a range, the treatment liquid is likely to be consistently ejected by an ink jet method.

The normal boiling point of the water-soluble organic solvent may be 160° C. to 280° C. In addition, the content, by mass, of organic solvents having a normal boiling point of more than 280° C. may be limited to 3% or less, for example, 1% or less or 0.5% or less, relative to the total mass of the treatment liquid. In an embodiment, the content of such organic solvents may be 0%. In the present disclosure, the alkanolamine is not treated as the water-soluble organic solvent.

1. 1. 5. Resin Fine Particles

The material of the resin fine particles may be, but is not limited to, polyurethane resin or (meth)acrylic resin. The resin fine particles may be cationic or nonionic. In some embodiments, the resin fine particles used in the treatment liquid are of cationic resin, such as cationic polyurethane resin. Such resin fine particles tend to be effective in reducing bleeding in the resulting image and increasing the opacity and the rub resistance of the image. The material of the resin fine particles may be an individual resin or a combination of two or more resins.

In the embodiments using urethane resin fine particles, a urethane resin emulsion may be used. The urethane resin in the emulsion is a resin having a urethane bond in the molecule and is not otherwise limited. For example, the urethane resin may be polyether-type urethane resin having an ether bond, as well as the urethane bond, in the main chain, a polyester-type urethane resin having an ester bond, as well as the urethane bond, in the main chain, or a polycarbonate-type urethane resin having a carbonate linkage, as well as the urethane bond, in the main chain. The urethane resin fine particles may be cationic or anionic.

In the embodiments using acrylic resin fine particles, an acrylic resin emulsion may be used. The acrylic resin in the emulsion may be, but is not limited to, a polymer of one or more (meth)acrylic monomers, such as (meth)acrylic acid and (meth)acrylic esters, or a copolymer of a (meth)acrylic monomer and other monomers. The acrylic resin fine particles may be cationic or anionic.

The resin fine particle content in the treatment liquid may be 3% to 15%, for example, 5% to 15% or 7.5% to 12.5%, relative to the total mass of the treatment liquid. The treatment liquid containing 3% by mass or more of resin fine particles tends to further reduce bleeding in the resulting image and further increase the opacity and the rub resistance of the image. Also, when the resin fine particle content is 15% by mass or less, the treatment liquid is likely to be more consistently ejected by an ink jet method.

1. 1. 6. Surfactant

The surfactant used in the treatment liquid may be, but is not limited to, an acetylene glycol-based surfactant, a fluorosurfactant, or a silicone surfactant. In some embodiments, a silicone surfactant may be used. The surfactant may be an individual compound or a combination of two or more compounds.

The acetylene glycol-based surfactant may be, but is not limited to, at least one selected from the group consisting of 2,4,7,9-tetramethyl-5-decyne-4,7-diol and alkylene oxide adducts thereof, and 2,4-dimethyl-5-decyne-4-ol and alkylene oxide adducts thereof. The acetylene glycol-based surfactant may be an individual compound or a combination of two or more compounds.

Examples of the fluorosurfactant include, but are not limited to, perfluoroalkylsulfonic acid salts, perfluoroalkylcarboxylic acid salts, perfluoroalkylphosphoric acid esters, perfluoroalkylethylene oxide adducts, perfluoroalkylbetaines, and perfluoroalkylamine oxides. The fluorosurfactant may be an individual compound or a combination of two or more compounds.

The silicone surfactant used in the treatment liquid may be a polysiloxane compound or a polyether-modified organosiloxane. The silicone surfactant may be an individual compound or a combination of two or more compounds.

The surfactant content in the treatment liquid may be 0.10% to 1.5%, for example, 0.25% to 1% or 0.50% to 0.75%, relative to the total mass of the treatment liquid. When the surfactant content is in such a range, the treatment liquid is likely to be more consistently ejected by an ink jet method.

1. 2. Non-White Ink Composition

The non-white ink composition of the ink set disclosed herein is an aqueous ink composition containing a non-white pigment. What an aqueous composition is has been described above. The non-white ink composition may be an ink jet ink. Ink jet inks refer to inks used in such a manner as to be ejected from an ink jet head for printing. The ink compositions, other than the non-white ink composition, that will be described later herein may also be ink jet inks.

The non-white ink composition contains a non-white pigment and water and may optionally contain a water-soluble organic solvent, a pigment-dispersing resin, resin fine particles, and a surfactant. The constituents of the non-white ink composition will be described below. Some of the constituents of the treatment liquid may be contained in the non-white ink composition in the same proportions as in the treatment liquid. The same applies to the ink compositions other than the non-white ink composition.

1. 2. 1. Non-White Pigment

The non-white pigment is not particularly limited, and examples thereof will be presented below. The non-white pigment may be an individual pigment or a combination of two or more pigments.

Exemplary black pigments include, but are not limited to, No. 2300, No. 900, MCF 88, No. 33, No. 40, No. 45, No. 52, MA 7, MA 8, MA 100, and No. 2200B (all produced by Mitsubishi Chemical Corporation); Raven 5750, Raven 5250, Raven 5000, Raven 3500, Raven 1255, and Raven 700 (all produced by Carbon Columbia); Regal 400R, Regal 330R, Regal 660R, Mogul L, Monarch 700, Monarch 800, Monarch 880, Monarch 900, Monarch 1000, Monarch 1100, Monarch 1300, and Monarch 1400 (all produced by CABOT); and Color Black FW1, Color Black FW2, Color Black FW2V, Color Black FW18, Color Black FW200, Color Black 5150, Color Black 5160, Color Black S170, Printex 35, Printex U, Printex V, Printex 140U, Special Black 6, Special Black 5, Special Black 4A, and Special Black 4 (all produced by Degussa).

Exemplary yellow pigments include, but are not limited to, C. I. Pigment Yellows 1, 2, 3, 4, 5, 6, 7, 10, 11, 12, 13, 14, 16, 17, 24, 34, 35, 37, 53, 55, 65, 73, 74, 75, 81, 83, 93, 94, 95, 97, 98, 99, 108, 109, 110, 113, 114, 117, 120, 124, 128, 129, 133, 138, 139, 147, 151, 153, 154, 167, 172, and 180.

Exemplary magenta pigments include, but are not limited to, C. I. Pigment Reds 1, 2, 3, 4, 5, 6, 7, 8, 9, 10, 11, 12, 14, 15, 16, 17, 18, 19, 21, 22, 23, 30, 31, 32, 37, 38, 40, 41, 42, 48(Ca), 48(Mn), 57(Ca), 57:1, 88, 112, 114, 122, 123, 144, 146, 149, 150, 166, 168, 170, 171, 175, 176, 177, 178, 179, 184, 185, 187, 202, 209, 219, 224, and 245 and C. I. Pigment Violets 19, 23, 32, 33, 36, 38, 43, and 50.

Exemplary cyan pigments include, but are not limited to, C. I. Pigment Blues 1, 2, 3, 15, 15:1, 15:2, 15:3, 15:34, 15:4, 16, 18, 22, 25, 60, 65, and 66 and C. I. Vat Blues 4 and 60.

Pigments that can be used for color inks other than magenta, cyan and yellow include, but are not limited to, C. I. Pigment Greens 7 and 10, C. I. Pigment Browns 3, 5, 25, and 26, and C. I. Pigment Oranges 1, 2, 5, 7, 13, 14, 15, 16, 24, 34, 36, 38, 40, 43, and 63.

Pearl pigments may also be used as the non-white pigment, and examples thereof include, but are not limited to, pigments exhibiting pearly gloss or interference gloss, such as titanium dioxide-coated mica, fish scale foil, and bismuth oxychloride.

Metallic pigments may also be used as the non-white pigment, and examples thereof include, but are not limited to, elemental metals, such as aluminum, silver, gold, platinum, nickel, chromium, tin, zinc, indium, titanium, and copper and alloys thereof.

The non-white pigment content in the non-white ink composition may be 0.5% to 10%, for example, 1% to 8% or 2% to 6%, relative to the total mass of the non-white ink composition. When the non-white pigment content is in such a range, the non-white ink composition is likely to be consistently ejected by an ink jet method.

1. 2. 2. Water

The water content in the non-white ink composition may be 50% to 95%, for example, 50% to 85%, 55% to 80%, or 60% to 75%, relative to the total mass of the non-white ink composition. When the water content is in such a range, the non-white ink composition is likely to be more consistently ejected by an ink jet method.

1. 2. 3. Water-Soluble Organic Solvent

The water-soluble organic solvent may be selected from, but is not limited to, the water-soluble organic solvents presented as those used in the treatment liquid. The water-soluble organic solvent may be an individual compound or a combination of two or more solvents.

The water-soluble organic solvent content in the non-white ink composition may be 5% to 35%, for example, 10% to 30% or 15% to 25%, relative to the total mass of the non-white ink composition. When the water-soluble organic solvent content is in such a range, the non-white ink composition is likely to be more consistently ejected by an ink jet method.

1. 2. 4. Pigment-Dispersing Resin

The pigment-dispersing resin may be, but is not limited to, an acrylic resin, a polyurethane resin, a polyester resin, a polyamide resin, or a polyimide resin. The pigment-dispersing resin may be an individual resin dispersant or a combination of two or more resin dispersants.

Acrylic resins are formed by polymerization using one or more acrylic monomers. Acrylic monomers include acrylic acid, methacrylic acid, acrylates, and methacrylates. The acrylic resin used herein may be a copolymer, such as a vinyl monomer, formed by copolymerization of one or more acrylic monomers and one or more monomers other than acrylic monomers. Styrene is an example of the vinyl monomer.

Examples of the acrylic resin include, but are not limited to, acrylic acid-acrylonitrile copolymer, vinyl acetate-acrylic ester copolymer, acrylic acid-acrylic ester copolymer, styrene-acrylic acid copolymer, styrene-methacrylic acid copolymer, styrene-methacrylic acid-acrylic ester copolymer, styrene-α-methylstyrene-acrylic acid copolymer, and styrene-α-methylstyrene-acrylic acid-acrylic ester copolymer.

In the description disclosed herein, resins produced by polymerization using an acrylic monomer are treated as the acrylic resin.

Polyurethane resin is a generic term for resins having urethane bonds. The polyurethane resin used herein may have other bonds in addition to the urethane bonds, and examples of such a polyurethane resin include a polyether-type polyurethane resin having an ether bond in the main chain, a polyester-type polyurethane resin having an ester bond in the main chain, and a polycarbonate-type polyurethane resin having a carbonate linkage in the main chain.

For the non-white ink composition, the acid value of the pigment-dispersing resin may be 20 mg KOH/g or more, for example, 40 mg KOH/g or more, 50 mg KOH/g or more, or 80 mg KOH/g or more. Also, the acid value may be 20 mg KOH/g to 300 mg KOH/g, 20 mg KOH/g to 200 mg KOH/g, or 20 mg KOH/g to 150 mg KOH/g. In an embodiment, the acid value may be 20 mg KOH/g to 95 mg KOH/g, 30 mg KOH/g to 95 mg KOH/g, or 40 mg KOH/g to 90 mg KOH/g. The pigment-dispersing agent having an acid value of 20 mg KOH/g or more tends to enhance the reactivity of the non-white pigment with the treatment liquid, thus helping the treatment liquid to increase image quality. Pigment-dispersing agents having a high acid value tend to excessively enhance the reactivity and thus to be a cause of cracks. In some embodiments of the present disclosure, however, the acid value of the pigment-dispersing agent of the non-white ink composition is controlled in the above range to reduce cracks. The acid value can be controlled by changing the monomer species used in the polymerization and the proportion thereof to vary the amount of the acid group introduced to the backbone of the pigment-dispersing resin. As the amount of the acid group introduced is increased, the acid value is likely to increase. The acid group may be the carboxy group or the sulfo group.

For the non-white ink composition, the amine value of the pigment-dispersing resin may be 85 mg KOH/g or less, for example, 10 mg KOH/g or less, or 5 mg KOH/g. In an embodiment, it may be 0 mg KOH/g. The use of a pigment-dispersing resin having such an amine value in the non-white ink composition tends to reduce cracks. The amine value can be controlled by changing the monomer species used in the polymerization and the proportion thereof to vary the amount of the amine group introduced to the backbone of the pigment-dispersing resin. As the amount of the amine group introduced is increased, the amine value is likely to increase. The acid value and the amine value can be measured by potentiometric neutralization titration specified in JIS.

The pigment-dispersing resin content in the non-white ink composition may be 0.10% to 5%, for example, 0.10% to 3%, 0.10% to 1.5%, 0.25% to 1%, or 0.50% to 0.75%, relative to the total mass of the non-white ink composition. The use of a pigment-dispersing resin in such a proportion tends to increase image quality and reduce cracks.

1. 2. 5. Resin Fine Particles

The resin fine particles may be selected from, but are not limited to, the species presented as those used in the treatment liquid. The resin fine particles used in the non-white ink composition are anionic or nonionic. In some embodiments, the resin fine particles are anionic. Also, the material of the resin fine particles may be a polyurethane resin or an acrylic resin. In some embodiments, polyurethane resin fine particles are used. Such resin fine particles tend to be effective in increasing the rub resistance of the resulting image. The material of the resin fine particles may be an individual resin or a combination of two or more resins.

The resin fine particle content in the non-white ink composition may be 3% to 15%, for example, 5% to 15% or 7.5% to 12.5%, relative to the total mass of the non-white ink composition. The non-white ink composition containing 3% by mass or more of resin fine particles tends to further increase the rub resistance of the resulting image. Also, when the resin fine particle content is 15% by mass or less, the ink composition is likely to be more consistently ejected by an ink jet method.

1. 2. 6. Surfactant

The surfactant may be selected from, but is not limited to, the surfactants presented as those used in the treatment liquid. The surfactant may be an individual compound or a combination of two or more compounds.

The surfactant content in the non-white ink composition may be 0.10% to 1.5%, for example, 0.25% to 1% or 0.50% to 0.75%, relative to the total mass of the non-white ink composition. When the surfactant content is in such a range, the ink composition is likely to be more consistently ejected by an ink jet method.

1. 3. White Ink Composition

The white ink composition of the ink set disclosed herein is an aqueous ink composition containing a white pigment. The white ink composition contains a white pigment and water and may optionally contain a pigment-dispersing resin, resin fine particles, a surfactant, and a water-soluble organic solvent. The constituents of the white ink composition will be described below.

1. 3. 1. White Pigment

Examples of the white pigment used in the white ink composition includes, but are not limited to, C. I. Pigment Whites 6, 18, and 21 and other inorganic white pigments, such as, titanium oxide, zinc oxide, zinc sulfide, antimony oxide, magnesium oxide, and zirconium oxide. Also, organic white pigments, apart from these inorganic white pigments, may be used, such as white hollow resin particles and white polymer particles.

When an organic non-white pigment and an inorganic white pigment are used, cracks often occur due to differences in reactivity with the treatment liquid, content, and heat shrinkage between the organic pigment and the inorganic pigment. However, since the treatment liquid disclosed herein is effective in reducing cracks, the ink set disclosed herein is useful for the embodiments using an inorganic white pigment in the white ink composition.

The white pigment content in the white ink composition may be 3% to 17%, for example, 5% to 15% or 7.5% to 12.5%, relative to the total mass of the white ink composition. When the white pigment content is in such a range, the white ink composition is likely to form highly opaque images and to be more consistently ejected by an ink jet method.

1. 3. 2. Water

The water content in the white ink composition may be 45% to 95%, for example, 50% to 80%, 50% to 75%, or 55% to 70%, relative to the total mass of the white ink composition. When the water content is in such a range, the white ink composition tends to be consistently ejected by an ink jet method.

1. 3. 3. Water-Soluble Organic Solvent

The water-soluble organic solvent may be selected from, but is not limited to, the water-soluble organic solvents presented as those used in the treatment liquid. The water-soluble organic solvent may be an individual compound or a combination of two or more solvents.

The water-soluble organic solvent content in the white ink composition may be 5% to 35%, for example, 10% to 30% or 15% to 25%, relative to the total mass of the white ink composition. When the water-soluble organic solvent content is in such a range, the white ink composition is likely to be more consistently ejected by an ink jet method.

1. 3. 4. Pigment-Dispersing Resin

The pigment-dispersing resin may be selected from, but not is limited to, the dispersing resins presented as those used in the non-white ink composition. The pigment-dispersing resin may be an individual resin dispersant or a combination of two or more resin dispersants.

For the white ink composition, the acid value of the pigment-dispersing resin may be 10 mg KOH/g or less, for example, 0 mg KOH/g to 7 mg KOH/g or 0 mg KOH/g to 5 mg KOH/g. The pigment-dispersing agent having an acid value of 10 mg KOH/g or less is likely to reduce the reactivity of the white ink composition with the treatment liquid and increase the opacity of the coating of the white ink composition. The acid value can be controlled by changing the monomer species used in the polymerization and the proportion thereof to vary the amount of the acid group introduced to the backbone of the pigment-dispersing resin.

For the white ink composition, the amine value of the pigment-dispersing resin may be 10 mg KOH/g or less, for example, 0 mg KOH/g to 7 mg KOH/g or 0 mg KOH/g to 5 mg KOH/g. The pigment-dispersing agent having an amine value of 10 mg KOH/g or less is likely to reduce the reactivity of the white ink composition with the treatment liquid and increase the opacity of the coating of the white ink composition. The amine value can be controlled by changing the monomer species used in the polymerization and the proportion thereof to vary the amount of the amine group introduced to the backbone of the pigment-dispersing resin.

By relatively reducing the acid value or the amine value of the pigment-dispersing resin in the white ink composition, or by relatively increasing the acid value or the amine value of the pigment-dispersing resin in the non-white ink composition, the white and non-white ink compositions become unlikely to form aggregates and thus to cause cracks. When an organic non-white pigment and an inorganic white pigment are used, cracks often occur, as mentioned above. Accordingly, it is particularly beneficial in such a case to give a difference in acid value between the pigment-dispersing resin of the white ink composition and the pigment-dispersing resin of the non-white ink composition.

1. 3. 5. Resin Fine Particles

The resin fine particles may be selected from, but are not limited to, the species presented as those used in the treatment liquid and the non-white ink composition. The resin fine particles used in the white ink composition are anionic or nonionic. In some embodiments, the resin fine particles are anionic. Also, the material of the resin fine particles may be a polyurethane resin or an acrylic resin. In some embodiments, polyurethane resin fine particles are used. Such resin fine particles tend to be effective in increasing the rub resistance of the resulting image. The material of the resin fine particles may be an individual resin or a combination of two or more resins.

The resin fine particle content in the white ink composition may be 3% to 15%, for example, 5% to 15% or 7.5% to 12.5%, relative to the total mass of the white ink composition. The white ink composition containing 3% by mass or more of resin fine particles tends to further increase the rub resistance of the resulting image. Also, when the resin fine particle content is 15% by mass or less, the ink composition is likely to be more consistently ejected by an ink jet method.

1. 3. 6. Surfactant

The surfactant may be selected from, but is not limited to, the surfactants presented as those used in the treatment liquid. The surfactant may be an individual compound or a combination of two or more compounds.

The surfactant content in the white ink composition may be 0.10% to 1.5%, for example, 0.25% to 1% or 0.50% to 0.75%, relative to the total mass of the white ink composition. When the surfactant content is in such a range, the ink composition is likely to be more consistently ejected by an ink jet method.

1. 4. Clear Ink Composition

The clear ink composition is not intended to color the printing medium but to improve the quality, such as gloss and rub resistance, of the printed item. It is therefore beneficial to limit the coloring material content in the clear ink composition to, by mass, 0.2% or less or 0.1% or less, more beneficially to 0.05% or less. In some embodiments, the clear ink composition does not contain any coloring material. In some embodiments, the clear ink composition is aqueous. The clear ink composition may be an ink jet ink. The clear ink composition is not the treatment liquid described above.

The clear ink composition may contain an alkanolamine. Also, the clear ink composition may optionally contain water, a water-soluble organic solvent, resin fine particles, and a surfactant. The constituents of the clear ink composition will be described below.

1. 4. 1. Alkanolamine

The alkanolamine used in the clear ink composition may be, but is not limited to, the same as the alkanolamine described as that used in the treatment liquid. The alkanolamine in the clear ink composition is likely to further reduce cracks. The alkanolamine used in the clear ink composition may be an individual alkanolamine or a combination of two or more alkanolamines.

The alkanolamine content in the clear ink composition may be 0.1% to 2%, for example, 0.1% to 1%, 0.2% to 0.9%, or 0.4% to 0.8%, relative to the total mass of the clear ink composition. When the alkanolamine content is in such a range, the clear ink composition tends to further reduce cracks.

1. 4. 2. Water

The water content in the clear ink composition may be 50% to 99%, for example, 55% to 80%, 60% to 75%, or 65% to 70%, relative to the total mass of the clear ink composition. When the water content is in such a range, the clear ink composition is likely to be more consistently ejected by an ink jet method.

1. 4. 3. Water-Soluble Organic Solvent

The water-soluble organic solvent may be selected from, but is not limited to, the water-soluble organic solvents presented as those used in the treatment liquid. The water-soluble organic solvent may be an individual compound or a combination of two or more solvents.

The water-soluble organic solvent content in the clear ink composition may be 5% to 35%, for example, 10% to 30% or 15% to 25%, relative to the total mass of the clear ink composition. When the water-soluble organic solvent content is in such a range, the clear ink composition is likely to be more consistently ejected by an ink jet method.

1. 4. 4. Resin Fine Particles

The resin fine particles may be selected from, but are not limited to, the species presented as those used in the treatment liquid and the ink compositions described above. The resin fine particles used in the clear ink composition are anionic or nonionic. In some embodiments, the resin fine particles are anionic.

The material of the resin fine particles may be a polyurethane resin or an acrylic resin. In some embodiments, polyurethane resin fine particles are used. Such resin fine particles tend to be effective in further reducing cracks. The material of the resin fine particles may be an individual resin or a combination of two or more resins.

The resin fine particle content in the clear ink composition may be 3% to 15%, for example, 5% to 15% or 7.5% to 12.5%, relative to the total mass of the clear ink composition. The clear ink composition containing 3% by mass or more of resin fine particles tends to further reduce cracks. Also, when the resin fine particle content is 15% by mass or less, the ink composition is likely to be more consistently ejected by an ink jet method.

1. 4. 5. Surfactant

The surfactant may be selected from, but are not limited to, the surfactants presented as those used in the treatment liquid. The surfactant may be an individual compound or a combination of two or more compounds.

The surfactant content in the clear ink composition may be 0.10% to 1.5%, for example, 0.25% to 1% or 0.50% to 0.75%, relative to the total mass of the clear ink composition. When the surfactant content is in such a range, the ink composition is likely to be more consistently ejected by an ink jet method.

2. Printing Method

In the printing method disclosed herein, printing media are printed with the ink set described above. More specifically, the printing method includes a treatment liquid application step of applying the treatment liquid onto a printing medium to form a treatment liquid coating, a white ink application step of applying a white ink composition onto the printing medium to form a white ink coating, and a non-white ink application step of applying a non-white ink composition onto the printing medium to form a non-white ink coating. The non-white ink coating, the white ink coating, and the treatment liquid coating are formed one on top of another to define a superimposed region.

The printing method according to some embodiments may include a treatment liquid application step of applying the treatment liquid onto a printing medium to form a treatment liquid coating, a white ink application step of ejecting the white ink composition from an ink jet head for application onto the printing medium, thus forming a white ink coating, and a non-white ink application step of ejecting the non-white ink composition from an ink jet head for application onto the printing medium, thus forming a non-white ink coating. The non-white ink coating, the white ink coating, and the treatment liquid coating are formed one on top of another to define a superimposed region.

The printing method may further include a clear ink application step of applying the clear ink composition onto the printing medium to form a clear ink coating. In the clear ink application step, the clear ink composition may be ejected from an ink jet head for the application onto the printing medium. The process steps of the printing method will now be described in detail.

2. 1 Printing Medium

In the printing method disclosed herein, poorly absorbent or non-absorbent media are used as the printing medium. Poorly absorbent or non-absorbent printing media are resistant to water and rubbing but tend to be repellent to the treatment liquid and aqueous ink compositions, being less adhesive with the ink compositions. The ink set and the printing method disclosed herein are useful to such printing media.

The poorly absorbent printing medium may be, but is not limited to, coated paper including a coating layer at the surface thereof for receiving oil-based ink. The coated paper may be, but is not limited to, book-printing paper, such as art paper, coat paper, or matte paper.

Non-absorbent printing media include, but are not limited to, plastic films or plates, such as those of polyvinyl chloride, polyethylene, polypropylene, polyethylene terephthalate (PET), polycarbonate, polystyrene, and polyurethane; metal plates, such as those of iron, silver, copper, and aluminum; metal-coated metal plates or plastic films formed by vapor-depositing such a metal on a metal plate or plastic film; alloy plates, such as those of stainless steel and brass; and paper sheets coated with (bonded to) a plastic film, such as that of polyvinyl chloride, polyethylene, polypropylene, polyethylene terephthalate (PET), polycarbonate, polystyrene, or polyurethane.

Poorly absorbent or non-absorbent printing media used herein are such that the surface thereof absorbs water at a rate of 10 mL/m$^2$ or less for a period of 30 ms from the beginning of contact with water when measured by the Bristow method. The Bristow method is most broadly used for measuring liquid absorption for a short time, and Japan Technical Association of the Pulp and Paper Industry (JAPAN TAPPI) officially adopts this method. Details of this method are specified in Standard No. 51 (Paper and Paperboard—Liquid Absorption Test Method—Bristow's Method (in Japanese)) of JAPAN TAPPI Paper and Pulp Test Methods edited in 2000 (in Japanese).

2. 2. Treatment Liquid Application Step

In the treatment liquid application step, the treatment liquid is applied onto the printing medium to form a treatment liquid coating. The treatment liquid may be applied by, but not limited to, roller coating, spray coating, or an ink jet method. Any device or mechanism capable of such an application manner may be used. If the treatment liquid is applied by an ink jet method, the application mechanism is an ink jet head.

2. 3. Heating Step

In an embodiment, the printing method may include a heating step of heating the printing medium. This heating step is performed at least in any of the treatment liquid application steps and the ink application steps and/or between the application steps. This step may be referred to as the primary heating. In some embodiments, the primary heating step may be performed either during the treatment liquid application step or between the treatment liquid application step and the first of the ink application steps. When the printing medium is heated with such timing, an appropriate amount of solvent is likely to remain in the treatment liquid coating.

When the printing medium is heated during any of the ink application steps, the ink composition is rapidly dried after reaching the printing medium and results in high image quality.

The heating device used for this heating step may be selected depending on the timing of heating, and examples thereof includes, but is not limited to, a platen heater, a fan, a radiation irradiator, or a drying heater provided in the middle of the printing medium feeding path.

The heating temperature in the primary heating step may be the surface temperature of the portion of the printing medium subjected to the application steps or the surface temperature of the printing medium during the application steps. The surface temperature of the printing medium may be set at 15° C. to 50° C., for example, 20° C. to 45° C., 25° C. to 40° C., 30° C. to 38° C., or 30° C. to 35° C.

Although the primary heating is not necessarily performed for each application step, the surface temperature of the printing medium in the application steps may be in such a range.

By controlling the surface temperature of the printing medium, the resulting image quality can be further increased while reducing cracks. Also, the evaporation of solvent from the ink compositions at the nozzles is reduced and, thus, the consistent ejection of the ink compositions can be maintained.

Another heating step may be performed after all the application steps of the treatment liquid and the ink compositions. This step may be referred to as the secondary heating. For the secondary heating, the surface temperature of the printing medium may be set at 60° C. to 100° C.

2. 4. White Ink Application Step

In the white ink application step, the white ink composition may be applied by any method, such as screen printing, flexography, relief printing, intaglio printing, or gravure printing. The printing apparatus may be provided with any device for application of the white ink composition. In some embodiments, the white ink application may be applied onto the printing medium by being ejected from an ink jet head, thus forming a white ink coating. Such a method for ejection is referred to as an ink jet method. In an ink jet method, more specifically, the composition in a pressure generating chamber of an ink jet head is ejected through nozzles by the operation of a pressure-generating device.

2. 5. Non-White Ink Application Step

In the non-white ink application step, the non-white ink composition is applied onto the printing medium in the same manner as the white ink composition. In some embodiments, the non-white ink composition is applied onto the printing medium by being ejected from an ink jet head, thus forming a non-white ink coating.

The application order of the non-white and white ink compositions is not particularly specified. The white ink composition may be applied onto the printing medium to form a white ink coating and followed by applying the non-white ink composition onto the white ink coating, or the non-white ink composition may be applied onto the printing medium to form a non-white ink coating and followed by applying the white ink composition onto the non-white ink coating.

When the white or non-white ink composition is applied following the application of the treatment liquid, it is beneficial to apply the ink composition onto the treatment liquid coating in which part of the solvent remains. Such an application manner tends to increase image quality and rub resistance and reduce cracks.

When the first of the ink application steps is started, the percentage of solvent remaining may be, by mass, 50% or more, for example, 60% to 90%, in the treatment liquid coating. Such an application manner tends to increase image quality and rub resistance and reduce cracks. The percentage of solvent remaining can be controlled by controlling the temperature, the period, or the like for the primary heating of the treatment liquid.

The amount of the treatment liquid applied onto the printing medium may be 3% to 30%, for example, 5% to 20% or 5% to 15%, relative to the total mass of the ink compositions to be applied. When the treatment liquid is applied in such a proportion, the image quality and rub resistance of the resulting printed item tend to increase.

2. 6. Clear Ink Applying Step

The printing method disclosed herein may further include a clear ink application step of applying the clear ink composition onto the printing medium to form a clear ink coating. In some embodiments, the clear ink composition may be applied onto the printing medium by an ink jet method.

In this instance, the clear ink coating is formed at least over the superimposed region in which the non-white ink coating, the white ink coating, and the treatment liquid coating lie one on top of another.

One of the white ink composition and the non-white ink composition may be applied onto the printing medium subsequent to the other by the same scanning motion as the clear ink composition. Such an application manner tends to increase image quality and rub resistance. Alternatively, the clear ink application step may be performed after all the scanning motions for applying the white ink and non-white ink compositions onto the printing medium are completed. Thus, rub resistance can be further increased.

3. Printing Apparatus

The printing apparatus disclosed herein, which is used to print poorly absorbent or non-absorbent printing media, includes an application mechanism operable to apply a non-white ink composition onto a printing medium, an application mechanism operable to apply a white ink composition onto the printing medium, and an application mechanism operable to apply a treatment liquid onto the printing medium. The printing apparatus may further include an application mechanism operable to apply a clear ink composition onto the printing medium.

In an embodiment, the printing apparatus may include an ink jet head operable to eject the non-white ink composition, an ink jet head operable to eject the white ink composition, and an ink jet head operable to eject the treatment liquid. The printing apparatus may also include an ink jet head operable to eject the clear ink composition. An exemplary structure of the printing apparatus will now be described.

The FIGURE is a schematic side view illustrating the entirety of an ink jet printing apparatus 1 used in an embodiment of the present disclosure. As shown in the FIGURE, the ink jet printing apparatus 1 includes a printing medium supply unit 10, a feed unit 20, a printing unit 30, a dryer set 90, and an ejection section 70.

The dryer set 90 includes a first dryer 40 that dries the treatment liquid and the ink compositions, and a second dryer 50 that dries the resulting printed item.

The supply unit 10 is configured to supply a rolled printing medium F to the feed unit 20. More specifically, the supply unit 10 includes a medium roll holder 11 that holds the rolled printing medium F. The printing medium F is supplied to the feed unit 20 downstream in the medium feeding direction Y by rotating the roll of the printing medium F.

The feed unit 20 is configured to feed the printing medium F coming from the supply unit 10 to the printing unit 30. More specifically, the feed unit 20 includes a first feed roller 21 to feed the printing medium F supplied thereto to the printing unit 30 located downstream in the medium feeding direction Y.

The printing unit 30 is configured for printing by applying the treatment liquid onto the printing medium F fed from the feed unit 20 and ejecting the ink compositions onto the printing medium. More specifically, the printing unit 30 includes a head 31 for the treatment liquid application step, printing heads 32 for the white ink application step, the non-white ink application step, and the clear ink application step, and a platen 34 to support the printing medium.

The platen 34 is configured to support the printing medium F from the rear side of the printing medium F. The platen 34 is provided with the first dryer 40 that dries the treatment liquid and the ink compositions on the printing medium F. In addition, a second feed roller 43 is disposed downstream from the platen 34 in the medium feeding direction Y. The second feed roller 43 is configured to feed the printed medium F to the second dryer 50 located downstream in the medium feeding direction Y.

The second dryer 50 is configured to further dry the treatment liquid and the ink compositions on the printing medium F. Furthermore, a third feed roller 65 is disposed near the exit 64 of the second dryer 50. The third feed roller 65 is disposed in such a manner as to come into contact with the rear side of the printing medium F and is configured to feed the printing medium F to the ejection section 70 located downstream in the medium feeding direction Y.

The ejection section 70 is configured to further feed the printing medium F fed from the second dryer 50 downstream in the medium feeding direction Y and eject the printing medium F from the ink jet printing apparatus 1. More specifically, the ejection section 70 includes a fourth feed roller 71, a fifth feed roller 72, a sixth feed roller 73, a seventh feed roller 74, and a take-up roller 75. The fourth feed roller 71 and the fifth feed roller 72 are disposed in such a manner as to come into contact with the surface of the printing medium F. The sixth feed roller 73 and the seventh feed roller 74 are disposed in such a manner as to define a roller pair. The printing medium F ejected by the sixth feed roller 73 and the seventh feed roller 74 is wound on the take-up roller 75.

The ink jet printing apparatus may be a serial type. The ink jet head of serial ink jet printers is mounted on a carriage. In such a serial ink jet printer, a printing medium is printed by alternately repeating a main scanning motion and a sub-scanning motion. The main scanning motion is that the serial ink jet head applies the ink or any other liquid composition onto a printing medium by ejecting the ink or liquid composition while moving across the printing medium in a main scanning direction. The sub-scanning motion is to feed the printing medium in a sub-scanning direction. For example, a serial ink jet printing apparatus is illustrated in FIG. 2 disclosed in JP-A-2019-81351.

In an embodiment, a plurality of ink jet heads may be arranged in the medium feeding direction across a region. For example, the ink jet head for the treatment liquid, the ink jet head for the white ink composition, and the ink jet head for the non-white ink composition may be arranged in this order in the medium feeding direction. In this instance, the treatment liquid, the white ink composition, and the non-white ink composition are applied in this order one on top of another in a region of the printing medium in the respective main scanning motions by alternately repeating the main scanning motion and the sub-scanning motion. The arrangement of the ink jet heads is not limited to this order.

Alternatively, a plurality of ink jet heads may be arranged in such a manner that the ink jet heads are coincident in position with each other in the medium feeding direction when projected in the main scanning direction. For example, such an arrangement may include an ink jet head for the non-white ink composition and an ink jet head for the clear ink composition. In this instance, the non-white ink composition and the clear ink composition may be applied one on top of the other in a region of the printing medium in the same main scanning motion. The ink compositions or the like applied in the same main scanning motion are not limited to these inks. The main scanning motion is often referred to as a pass.

The ink jet printing apparatus may be a line type. The ink jet head of line ink jet printing apparatuses is long across the width of the printing medium. In the embodiments using such a line head, the printing medium is printed by the scanning motion of ejecting an ink or the like to apply the ink or the like onto the printing medium being fed in the medium feeding direction. In this instance, a plurality of line heads may be arranged one after another in the order in the medium feeding direction.

In serial printing, when the clear ink composition and one of the white ink and non-white ink compositions are applied in the same main scanning motion, the time interval before the clear ink composition reaches the printing medium after one of the white and non-white ink compositions has reached the printing medium subsequent to the other is likely to be 100 ms or less. In contrast, when the clear ink composition is applied in an independent main scanning motion by serial printing, or in the case of line printing, such a time interval is likely to exceed 100 ms and may be 500 ms or more or 1000 ms or more. The lower limit of the time interval may be 0 ms or more, and the upper limit may be, but is not limited to, 10000 ms or less.

EXAMPLES

The subject matter of the present disclosure will be further described in detail with reference to Examples and Comparative Examples. However, the implementation of the concept of the present disclosure is not limited to the following Examples.

1. 1. Synthesis 1 (Resin B)

A reaction vessel equipped with a stirrer, a thermometer, a reflux tube, and a dropping funnel was purged with nitrogen and then charged with 300 parts by mass of methyl ethyl ketone. Then, into the reaction vessel were dropped 100 parts by mass in total of styrene and acrylic monomers, 0.2 part by mass of ammonium persulfate, and 0.3 part by mass of t-dodecyl mercaptan from the dropping funnel over a period of 4 hours for the polymerization of pigment-dispersing resin B. Subsequently, methyl ethyl ketone was added into the reaction vessel to yield 40 mass % resin B solution. In this synthesis, the acid value and the amine value of the pigment-dispersing resin were adjusted to those presented in Table 2 by varying the monomers and the proportion thereof. The resulting resin was soluble in water.

1. 2. Synthesis 2, 3 and 4 (Resins D, E, and F, Respectively)

Pigment-dispersing Resins D, E, and F were prepared in the same manner as in Synthesis 1 except that the acid value and the amine value of the resin were adjusted to those presented in Table 2. The resulting resins were soluble in water.

1. 3. Acid and Amine Values of Pigment-Dispersing Resins

The acid value and the amine value of the pigment-dispersing resins were measured in accordance with JIS K 0070 and JIS K 7237, respectively, with a titrator AT610 manufactured by Kyoto Electronics Manufacturing Co., Ltd.

2. Preparation of Treatment Liquids

The constituents were placed into a stainless-steel mixing tank according to the composition presented in Table 1 and stirred and mixed for complete dissolution, followed by further stirring at room temperature for 1 hour. Then, the resulting solution was filtered through a 5 μm membrane filter to yield any of the treatment liquids. The values for the constituents presented in Table 1 are represented by percent by mass.

TABLE 1

| | | Treatment liquid | | | | | | |
|---|---|---|---|---|---|---|---|---|
| | | A | B | C | D | E | F | G |
| Alkanol amine | Triisopropanolamine | 0.6 | 0.3 | 0.6 | — | 0.6 | 0.6 | — |
| | Triethanolamine | — | — | — | — | — | — | 0.6 |
| Flocculant | Organic acid | 4 | 4 | 4 | 4 | — | — | 4 |
| | Cationic polymer | — | — | — | — | 4 | — | — |
| | Multivalent metal salt | — | — | — | — | — | 4 | — |

TABLE 1-continued

|  |  | Treatment liquid | | | | | | |
|---|---|---|---|---|---|---|---|---|
|  |  | A | B | C | D | E | F | G |
| Surfactant | BYK 348 | 0.6 | 0.6 | 0.6 | 0.6 | 0.6 | 0.6 | 0.6 |
| Resin fine particles | Cationic urethan resin | 10 | 10 | — | 10 | 10 | 10 | 10 |
|  | Anionic urethan resin | — | — | — | — | — | — | — |
|  | Anionic acrylic resin | — | — | — | — | — | — | — |
| Water-soluble organic solvent | Diethylene glycol | 20 | 20 | 20 | 20 | 20 | 20 | 20 |
| Water |  | 64.8 | 65.1 | 74.8 | 65.4 | 64.8 | 64.8 | 64.8 |
| Total |  | 100 | 100 | 100 | 100 | 100 | 100 | 100 |

3. Preparation of Ink Compositions

First, a coloring material, a pigment-dispersing resin, and a portion of solvent were added into a pigment dispersing tank and stirred with ceramic beads of 1 mm in diameter to yield a pigment dispersion liquid in which the coloring material was dispersed in the solvent. The rest of the constituents were added into a stainless mixing tank in proportions presented in Table 2 and stirred for mixing. After the constituents were completely dissolved, the pigment dispersion liquid was added, followed by stirring at room temperature for 1 hour. Then, the mixture was filtered through a 5 μm membrane filter to yield any of the ink compositions used in the Examples. The values for the constituents presented in Table 2 are represented by percent by mass.

TABLE 2

|  |  | Non-white ink | | | | | | White ink | | | Clear ink | | |
|---|---|---|---|---|---|---|---|---|---|---|---|---|---|
|  |  | A | B | C | D | E | F | A | B | C | A | B | C |
| Alkanol amine | Triisopropanolamine | — | — | — | — | — | — | — | — | — | 0.6 | 0.6 | — |
|  | Triethanolamine | — | — | — | — | — | — | — | — | — | — | — | — |
| Pigment-dispersing resin | Resin A (acid value 75, amine value 0) | 0.6 | 0.6 | — | — | — | 1.2 | — | — | — | — | — | — |
|  | Resin B (acid value 85, amine value85) | — | — | 0.6 | — | — | — | — | — | — | — | — | — |
|  | Resin C (acid value 36, amine value 0) | — | — | — | 0.6 | — | — | — | — | — | — | — | — |
|  | Resin D (acid value 85, amine value 0) | — | — | — | — | 0.6 | — | — | — | — | — | — | — |
|  | Resin E (acid value 0, amine value 0) | — | — | — | — | — | — | 2 | 2 | — | — | — | — |
|  | Resin F (acid value 5, amine value 0) | — | — | — | — | — | — | — | — | 2 | — | — | — |
| Pigment | Titanium oxide | — | — | — | — | — | — | 10 | 10 | 10 | — | — | — |
|  | Pigment Blue 15:3 | 4 | 4 | 4 | 4 | 4 | 4 | — | — | — | — | — | — |
| Surfactant | BYK 348 | 0.6 | 0.6 | 0.6 | 0.6 | 0.6 | 0.6 | 0.6 | 0.6 | 0.6 | 0.6 | 0.6 | 0.6 |
| Resin fine particles | Cationic urethan resin | — | — | — | — | — | — | — | — | — | — | — | — |
|  | Anionic urethan resin | 10 | — | 10 | 10 | 10 | 10 | 10 | — | 10 | 10 | — | 10 |
|  | Anionic acrylic resin | — | — | — | — | — | — | — | — | — | — | 10 | — |
| Water-soluble organic solvent | Diethylene glycol | 20 | 20 | 20 | 20 | 20 | 20 | 20 | 20 | 20 | 20 | 20 | 20 |
| Water |  | 64.8 | 74.8 | 64.8 | 64.8 | 64.8 | 64.2 | 57.4 | 67.4 | 57.4 | 68.8 | 68.8 | 69.4 |
| Total |  | 100 | 100 | 100 | 100 | 100 | 100 | 100 | 100 | 100 | 100 | 100 | 100 |

The constituents used are as follows:

Alkanolamines
  Triisopropanolamine (normal boiling point: 305° C.)
  Triethanolamine (normal boiling point: 335° C.)
Pigment-Dispersing Resins
  Resin A (acid value: 75, amine value: 0, JONCRYL 819 produced by BASF)
  Resin B (acid value: 85, amine value: 85, acrylic resin produced in Synthesis 1)
  Resin C (acid value: 36, amine value: 0, DISPERBYK-2095 produced by BYK Additives & Instruments)
  Resin D (acid value: 85, amine value: 0, acrylic resin produced in Synthesis 2)
  Resin E (acid value: 0, amine value: 0, acrylic resin produced in Synthesis 3)
  Resin F (acid value: 5, amine value: 0, acrylic resin produced in Synthesis 4)
Pigments
  Titanium oxide
  C. I. Pigment Blue 15:3 Flocculants
  Organic acid: malonic acid
  Cationic polymer: JETFIX 260 (produced by Satoda Chemical Industrial)
  Multivalent metal salt: calcium acetate
Surfactant
  BYK 348 (silicone surfactant, produced by BYK Additives & Instruments)
Resin Fine Particles
  Cationic urethane resin: SF620 (produced by Dai-ichi Kogyo Seiyaku)
  Anionic urethane resin: SF170 (produced by Dai-ichi Kogyo Seiyaku)
  Anionic acrylic resin: emulsion of anionic dispersible styrene-acrylic copolymer (Tg: 75° C.)
Water-Soluble Organic Solvent
  Diethylene glycol 4. Printing Test A printer SC-580650 manufactured by Seiko Epson was modified for evaluation tests. The modified printer included ink jet heads individually operable to eject the treatment liquid, the white ink composition, the non-white ink composition, and the clear ink composition. The ink jet heads were arranged in the medium feeding direction on the carriage so that the treatment liquid and the white, non-white, and clear ink compositions could be applied in this order onto the printing medium one on top of another. Printed items were produced by four-pass printing of each liquid or composition.

The modified printer was provided with a platen heater opposite the ink jet heads and with a fan above the ink jet heads operable to blow warm air. Thus, the surface temperature of the printing medium opposing the ink jet heads was controlled to a primary heating temperature with the platen heater and the warm air fan except for the Example in which the primary heating temperature was set at 25° C. In this Example, the printing test was performed with the platen heater and fan off.

The modified printer was also provided with a secondary drying mechanism downstream from the ink jet heads so that the printing medium that received the treatment liquid and the inks could be secondarily dried at 80° C.

In the Examples in which the non-white ink composition and the white ink composition were applied in this order (represented as "non-white→white" in Table 3), the ink jet heads for the ejection of the white ink composition and the non-white ink composition were arranged in the reversed order.

Also, in the Examples in which the time interval presented in Table 3 was 100 ms, another ink jet head for the clear ink composition was disposed next in the main scanning direction to the ink jet head for the non-white ink composition so that the clear ink and the non-white ink could be applied in the same main scanning motion (during the same pass). In the Example in which the time interval presented in Table 3 exceeded 100 ms, the clear ink was ejected from the ink jet head downstream from the ink jet head for the non-white ink composition so as to be applied in the pass after the pass for applying the non-white ink composition.

Each ink jet head had a nozzle density of 600 npi per line and 600 nozzles. The treatment liquid and the ink compositions were each introduced into a nozzle line of the corresponding head.

The application rate onto the printing medium was 10 mg/inch$^2$ for the white ink composition, 7 mg/inch$^2$ for the non-white ink composition, and 1 mg/inch$^2$ for the clear ink composition. The amount of the treatment liquid applied was adjusted to the percentage presented in Table 3 relative to the total weight of the ink compositions.

The treatment liquid and the ink compositions were applied onto a printing medium PYLEN Film-OT P2111 (OPP film, thickness: 20 μm, manufactured by TOYOBO) one on top of another in a region of the medium under the conditions presented in Table 3, thus forming a rectangular solid fill pattern.

Image Quality (Bleeding)

The pattern formed as described above was visually observed from the non-white ink coating side. Image quality in bleeding was evaluated according to the following criteria:

AA: The pattern did not have inconsistency in tone.
  A: The pattern had a few very small inconsistencies in tone.
  B: The pattern had many small inconsistencies in tone.
  C: The pattern had large inconsistencies in tone.

Resistance to Cracks

The pattern formed as described above was observed from both sides of the printing medium. The side having more serious cracks was evaluated according to the following criteria:

AA: No cracks were seen in the pattern irrespective of visual observation or using a loupe.
  A: There were no visible cracks, but a few minor cracks were seen through a loupe.
  B: There were a few visible cracks.
  C: There were many visible cracks.

Opacity

The printing medium with the printed pattern thereon was placed on a white paper sheet with the non-white ink coating side down and was observed from the white ink coating side. Opacity was evaluated according to the following criteria:

A: The non-white ink coating was not seen through the white ink coating.
  B: The non-white ink coating was slightly seen through the white ink pattern.
  C: The non-white ink coating was seen to some extent through the white pattern.

Rub Resistance

The pattern printed as described above was rubbed with a plain-woven cloth 100 times with a Gakushin-type rubbing tester at a load of 500 g, and the degree of peeling of the pattern was visually observed. Rub resistance was evaluated according to the following criteria:

AA: There was no peeling from the pattern.

A: There were peelings in 10% or less of the area of the pattern.

B: There were peelings in more than 10% to 30% of area of the pattern.

C: There were peelings in more than 30% to 50% of the area of the pattern.

D: There were peelings in more than 50% of the area of the pattern.

Resistance to Clogging

Printing was continued for 120 minutes under the printing test conditions. After printing, the number of nozzles that failed in ejection was counted. The results were evaluated in terms of clogging resistance according to the following criteria:

A: There was no nozzle that failed in ejection.

B: 0.5% or less of the nozzles failed in ejection.

C: More than 0.5% to 1% of the nozzles failed in ejection.

D: More than 1% of the nozzles failed in ejection.

TABLE 3

|  | Example 1 | Example 2 | Example 3 | Example 4 | Example 5 | Example 6 | Example 7 | Example 8 | Example 9 |
|---|---|---|---|---|---|---|---|---|---|
| Treatment liquid | Treatment A | Treatment B | Treatment C | Treatment E | Treatment F | Treatment G | Treatment A | Treatment A | Treatment A |
| Proportion (wt % to ink) of treatment liquid applied | 10 | 10 | 10 | 10 | 10 | 10 | 10 | 10 | 10 |
| Remaining wt % of solvent in treatment liquid | 90 | 90 | 90 | 90 | 90 | 90 | 90 | 90 | 90 |
| Non-white ink composition | Non-white A | Non-white A | Non-white A | Non-white A | Non-white A | Non-white A | Non-white B | Non-white C | Non-white D |
| White ink composition | White A | White A | White A | White A | White A | White A | White A | White A | White A |
| Clear ink composition | Clear A | Clear A | Clear A | Clear A | Clear A | Clear A | Clear A | Clear A | Clear A |
| Ink application order | White → Non-white | White → Non-white | White → Non-white | White → Non-white | White → Non-white | White → Non-white | White → Non-white | White → Non-white | White → Non-white |
| Interval before clear ink application (ms) | 100 | 100 | 100 | 100 | 100 | 100 | 100 | 100 | 100 |
| Primary heating temperature (° C.) | 30 | 30 | 30 | 30 | 30 | 30 | 30 | 30 | 30 |
| Image quality (Bleeding) | A | A | B | AA | AA | A | A | AA | B |
| Cracking resistance | A | B | A | AA | A | A | A | B | AA |
| Opacity | A | A | B | A | A | A | A | A | B |
| Rub resistance | A | A | B | AA | A | B | B | A | A |
| Clogging resistance, Treatment liquid | B | C | A | B | B | B | B | B | B |
| Clogging resistance, Non-white ink | A | A | A | A | A | A | A | B | B |
| Clogging resistance, White ink | A | A | A | A | A | A | A | A | A |

|  | Example 10 | Example 11 | Example 12 | Example 13 | Example 14 | Example 15 | Example 16 |
|---|---|---|---|---|---|---|---|
| Treatment liquid | Treatment A | Treatment A | Treatment A | Treatment A | Treatment A | Treatment A | Treatment A |
| Proportion (wt % to ink) of treatment liquid applied | 10 | 10 | 10 | 10 | 10 | 10 | 10 |
| Remaining wt % of solvent in treatment liquid | 90 | 90 | 90 | 90 | 90 | 90 | 90 |
| Non-white ink composition | Non-white E | Non-white F | Non-white A | Non-white A | Non-white A | Non-white A | Non-white A |
| White ink composition | White A | White A | White B | White C | White A | White A | White A |
| Clear ink composition | Clear A | Clear A | Clear A | Clear A | Clear B | Clear C | — |
| Ink application order | White → Non-white | White → Non-white | White → Non-white | White → Non-white | White → Non-white | White → Non-white | White → Non-white |
| Interval before clear ink application (ms) | 100 | 100 | 100 | 100 | 100 | 100 | — |
| Primary heating temperature (° C.) | 30 | 30 | 30 | 30 | 30 | 30 | 30 |
| Image quality (Bleeding) | AA | AA | A | A | A | A | A |
| Cracking resistance | B | B | A | AA | B | B | B |
| Opacity | A | A | B | B | A | A | A |
| Rub resistance | A | B | B | B | A | A | C |
| Clogging resistance, Treatment liquid | B | B | B | B | B | B | B |
| Clogging resistance, Non-white ink | A | B | A | A | A | A | A |
| Clogging resistance, White ink | A | A | A | B | A | A | A |

TABLE 3-continued

| | Example 17 | Example 18 | Example 19 | Example 20 | Example 21 | Example 22 | Example 23 | Example 24 | Example 25 |
|---|---|---|---|---|---|---|---|---|---|
| Treatment liquid | Treatment B | Treatment E | Treatment F | Treatment G | Treatment A | Treatment C | Treatment C | Treatment A | Treatment A |
| Proportion (wt % to ink) of treatment liquid applied | 10 | 10 | 10 | 10 | 30 | 10 | 10 | 10 | 10 |
| Remaining wt % of solvent in treatment liquid | 90 | 90 | 90 | 90 | 95 | 40 | 10 | 95 | 90 |
| Non-white ink composition | Non-white A | Non-white A | Non-white A | Non-white A | Non-white A | Non-white A | Non-white A | Non-white A | Non-white A |
| White ink composition | White A | White A | White A | White A | White A | White A | White A | White A | White A |
| Clear ink composition | — | — | — | — | Clear A | Clear A | Clear A | Clear A | Clear A |
| Ink application order | White → Non-white | White → Non-white | White → Non-white | White → Non-white | White → Non-white | White → Non-white | White → Non-white | White → Non-white | White → Non-white |
| Interval before clear ink application (ms) | — | — | — | — | 100 | 100 | 100 | 100 | 1000 |
| Primary heating temperature (° C.) | 30 | 30 | 30 | 30 | 30 | 35 | 45 | 25 | 30 |
| Image quality (Bleeding) | A | AA | AA | A | B | A | A | B | AA |
| Cracking resistance | B | A | A | B | B | B | B | A | B |
| Opacity | A | A | A | A | B | B | B | A | A |
| Rub resistance | B | A | B | C | B | B | B | A | AA |
| Clogging resistance, Treatment liquid | C | B | B | B | B | B | C | A | B |
| Clogging resistance, Non-white ink | A | A | A | A | A | B | C | A | A |
| Clogging resistance, White ink | A | A | A | A | A | B | C | A | A |

| | Example 26 | Comparative Example 1 | Comparative Example 2 | Comparative Example 3 | Reference Example 1 | Reference Example 2 | Reference Example 3 |
|---|---|---|---|---|---|---|---|
| Treatment liquid | Treatment A | Treatment D | Treatment D | Treatment D | — | Treatment D | Treatment D |
| Proportion (wt % to ink) of treatment liquid applied | 10 | 10 | 10 | 10 | — | 10 | 10 |
| Remaining wt % of solvent in treatment liquid | 90 | 90 | 90 | 90 | — | 90 | 90 |
| Non-white ink composition | Non-white A | Non-white A | Non-white A | Non-white A | Non-white A | Non-white A | — |
| White ink composition | White A | White A | White A | White A | White A | — | White A |
| Clear ink composition | Clear A | Clear A | Clear A | — | Clear A | Clear A | Clear A |
| Ink application order | Non-white → White | White → Non-white | Non-white → White | White → Non-white | White → Non-white | White → Non-white | White → Non-white |
| Interval before clear ink application (ms) | 100 | 100 | 100 | — | 100 | 100 | 100 |
| Primary heating temperature (° C.) | 30 | 30 | 30 | 30 | 30 | 30 | 30 |
| Image quality (Bleeding) | AA | A | A | A | C | AA | — |
| Cracking resistance | B | C | C | C | A | AA | AA |
| Opacity | A | A | A | A | A | — | — |
| Rub resistance | A | A | A | B | AA | A | A |
| Clogging resistance, Treatment liquid | B | B | B | B | — | B | B |
| Clogging resistance, Non-white ink | A | A | A | A | A | A | — |
| Clogging resistance, White ink | A | A | A | A | A | — | A |

In the Table, "Treatment" represents a treatment liquid; "Non-white" represents a non-white ink; "White" represents a white ink; and "Clear" represents a clear ink. Also, the ink application order "white→non-white" represents that the white ink application was followed by the non-white ink application, and "non-white→white" represents that the non-white ink application was followed by the white ink application.

The results of the Examples and Comparative Examples suggest that the use of a treatment liquid containing an alkanolamine can reduce cracks in the region where the white ink coating and the non-white ink coating lie one on the other.

In Examples 1 to 6, the treatment liquid was varied. Example 2, in which the treatment liquid contained an alkanolamine in a relatively low proportion, was inferior in terms of cracks to the other five Examples. Example 3, in which the treatment liquid did not contain resin fine particles, was slightly inferior in terms of rub resistance to some other Examples. Example 4, in which the treatment liquid contained a cationic polymer, resulted in high image quality, reduced cracks, and high rub resistance. Example 5, in which the treatment liquid contained a multivalent metal salt, resulted in high image quality. Example 6, in which the treatment liquid contained an alkanolamine having a low boiling point, was slightly inferior in terms of rub resistance to some other Examples.

In Examples 7 to 11, the non-white ink composition was varied. Example 7, in which the non-white ink composition did not contain resin fine particles, was slightly inferior in terms of rub resistance to other Examples. Example 8, in which the non-white ink composition contained a pigment-dispersing resin having a high amine value, was superior in terms of image quality but slightly inferior in terms of clogging resistance to other Examples. Example 9, in which the non-white ink composition contained a pigment-dispersing resin having a low acid value, was slightly inferior to other Examples in terms of image quality and opacity. Example 11, in which the non-white ink composition contained a pigment-dispersing resin in a larger proportion, was slightly inferior in terms of cracks to other Examples.

In Examples 12 to 13, the white ink composition was varied. Example 12, in which the white ink composition did not contain resin fine particles, was slightly inferior in terms of rub resistance to other Examples. Example 13, in which the white ink composition contained a pigment-dispersing resin having a high acid value, was slightly inferior to other Examples in terms of opacity and rub resistance.

In Examples 14 and 15, the clear ink composition was varied. Example 14, in which the clear ink composition contained anionic acrylic resin as the resin fine particles, was inferior in terms of cracks to other Examples. Example 15, in which the clear ink composition did not contain alkanolamine, was slightly inferior in terms of cracks to other Examples.

Examples 16 to 20, in which the clear ink composition was not used, exhibited a decreasing tendency of rub resistance compared to other Examples. Example 21, in which the treatment liquid was applied in a larger proportion, exhibited a decreasing tendency of resistance to cracking. Examples 22 and 23, in which the solvent in the treatment liquid was dried to a larger extent, exhibited a degraded resistance to cracking and a decreasing tendency of ejection consistency. Example 24, in which the drying degree of the solvent in the treatment liquid was reduced, exhibited a decreasing tendency of image quality. Example 25, in which the time interval from the application of the non-white ink composition before the application of the clear ink composition was larger, was slightly inferior in terms of resistance to cracking. In Example 26, the non-white ink composition was applied before the white ink composition.

In Comparative Examples 1 to 3, the treatment liquid did not contain alkanolamine. The results of Comparative Examples 1 to 3 suggest that the use of a treatment liquid not containing alkanolamine causes cracks irrespective of the application order of white and non-white ink compositions and of whether or not the clear ink composition is used.

In Reference Examples 1 to 3, one of the treatment liquid, the white ink composition, and the non-white ink composition was not used. The results of Reference Example 1 suggest that cracks do not occur even though the white and non-white ink compositions are applied one on the other as long as the treatment liquid is not used. The results of Reference Examples 2 and 3 suggest that when only either the white ink composition or the non-white ink composition is applied so that different ink coatings are not formed one on top of another, cracks do not occur. However, no use of a treatment liquid leads to degraded image quality, and the use of only either the white ink composition or the non-white ink composition makes it difficult to form desired images.

When a 100% cotton cloth, an absorbent printing medium, was printed under the conditions of Comparative Example 1, the resistance to cracking was evaluated as AA. This suggests that absorbent printing media do not cause cracks.

What is claimed is:

1. An ink set used for printing poorly absorbent or non-absorbent printing media, the ink set comprising:
   an aqueous non-white ink composition containing a non-white pigment;
   an aqueous white ink composition containing a white pigment; and
   a treatment liquid containing a flocculant and an alkanolamine,
   wherein the alkanolamine is a compound that contains a number of hydroxy groups that is in the range of 1 to 3, a number of amino groups that is 1, and a carbon number of 1 to 20.

2. The ink set according to claim 1, wherein
   the non-white ink composition contains a pigment-dispersing resin having an acid value of 20 mg KOH/g to 300 mg KOH/g.

3. The ink set according to claim 1, wherein
   the non-white ink composition contains a pigment-dispersing resin having an amine value of 10 mg KOH/g or less.

4. The ink set according to claim 1, wherein
   the white ink composition contains a pigment-dispersing resin having an acid value of 10 mg KOH/g or less.

5. The ink set according to claim 1, wherein
   the alkanolamine content in the treatment liquid is 0.1% to 2% relative to the total mass of the treatment liquid.

6. The ink set according to claim 1, further comprising a clear ink composition.

7. The ink set according to claim 1, wherein
   the treatment liquid contains resin fine particles.

8. The ink set according to claim 1, wherein
   the flocculant is a water-soluble compound selected from the group consisting of multivalent metal salts, organic acids, and cationic polymers.

9. The ink set according to claim 1, wherein
   the alkanolamine in the treatment liquid has a normal boiling point of 350° C. or less.

10. The ink set according to claim 1, wherein the alkanolamine is at least one selected from the group consisting of triethanolamine, tripropanolamine, triisopropanolamine, and tributanolamine.

11. A printing method for printing a poorly absorbent or non-absorbent printing medium, the method comprising:
- a treatment liquid application step of applying a treatment liquid containing a flocculant and an alkanolamine onto the printing medium to form a treatment liquid coating;
- a white ink application step of applying an aqueous white ink composition containing a white pigment onto the printing medium to form a white ink coating; and
- a non-white ink application step of applying an aqueous non-white ink composition containing a non-white pigment onto the printing medium to form a non-white ink coating,
- wherein
- the non-white ink coating, the white ink coating, and the treatment liquid coating are formed one on top of another to define a superimposed region; and
- the alkanolamine is a compound that contains a number of hydroxy groups that is in the range of 1 to 3, a number of amino groups that is 1, and a carbon number of 1 to 20.

12. The printing method according to claim 11, wherein the white ink application step and the non-white ink application step are performed after the treatment liquid application step in such a manner that one of the white ink composition and the non-white ink composition is applied before the other, in a region that is to be the superimposed region, onto the treatment liquid coating in a state where the percentage of solvent remaining is 50% by mass or more.

13. The printing method according to claim 11, further comprising a heating step of heating the printing medium after the treatment liquid application step and in the white ink application step or the non-white ink application step.

14. The printing method according to claim 11, further comprising a clear ink application step of applying a clear ink composition onto the printing medium to form a clear ink coating.

15. The printing method according to claim 14, wherein
- the white ink composition, the non-white ink composition, and the clear ink composition are applied by an ink jet method performed by alternately repeating a main scanning motion and a sub-scanning motion, and wherein
- one of the white ink composition and the non-white ink composition is applied subsequent to the other in the same main scanning motion as the clear ink composition.

16. A printing apparatus used for printing poorly absorbent or non-absorbent printing media, the printing apparatus comprising:
- a non-white ink application mechanism configured to apply an aqueous non-white ink composition containing a non-white pigment onto a printing medium;
- a white ink application mechanism configured to apply an aqueous white ink composition containing a white pigment onto the printing medium; and
- a treatment liquid application mechanism configured to apply a treatment liquid containing a flocculant and an alkanolamine onto the printing medium,
- wherein the alkanolamine is a compound that contains a number of hydroxy groups that is in the range of 1 to 3, a number of amino groups that is 1, and a carbon number of 1 to 20.

\* \* \* \* \*